US010366426B2

(12) United States Patent
Ryan et al.

(10) Patent No.: US 10,366,426 B2
(45) Date of Patent: Jul. 30, 2019

(54) PERSONALIZING HANDHELD ELECTRONIC BOOK READERS

(75) Inventors: Thomas A. Ryan, Los Gatos, CA (US); Gregg E. Zehr, Los Gatos, CA (US); Jason J. Marine, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 101 days.

(21) Appl. No.: 11/693,212

(22) Filed: Mar. 29, 2007

(65) Prior Publication Data

US 2008/0222156 A1 Sep. 11, 2008

Related U.S. Application Data

(60) Provisional application No. 60/882,859, filed on Mar. 9, 2007.

(51) Int. Cl.

*G06F 7/00* (2006.01)
*G06Q 30/06* (2012.01)
*G06F 9/4401* (2018.01)

(52) U.S. Cl.

CPC ........ *G06Q 30/0603* (2013.01); *G06F 9/4411* (2013.01)

(58) Field of Classification Search

CPC ..................................................... G06F 9/4411
USPC .................................... 707/104.1, 100, 10, 3
See application file for complete search history.

(56) References Cited

U.S. PATENT DOCUMENTS 5,440,480 A 8/1995 Costanza
5,534,888 A 7/1996 Lebby et al.
5,566,098 A 10/1996 Lucente et al.
5,603,084 A 2/1997 Henry, Jr. et al.
5,663,748 A 9/1997 Huffman et al.
5,761,485 A 6/1998 Munyan
5,847,698 A 12/1998 Reavey et al.
5,887,253 A 3/1999 O'Neil et al.
(Continued)

OTHER PUBLICATIONS

European Office Action dated Mar. 5, 2018 for European patent application No. 07870087.9, a counterpart foreign application of U.S. Appl. No. 11/693,212, 11 pages.
(Continued)

*Primary Examiner* — Eliyah S. Harper
(74) *Attorney, Agent, or Firm* — Lee & Hayes, P.C.

(57) ABSTRACT

Tools and techniques are described herein for personalizing handheld electronic book readers. The tools provide methods that include receiving an indication of a customer transaction involving an electronic book reader device. The methods may also receive an identifier associated with the customer, obtain personalization information associated with the identifier, and load the personalization information into the electronic book reader device. The tools also provide methods that include receiving a command that is input to the electronic book reader device, where the device has been personalized for the particular customer; and responding to the command using the personalization information. A server includes a processor and a computer-readable storage medium that includes a device personalization component for personalizing the electronic book reader device. The electronic book reader device includes a processor and computer-readable storage medium that includes a device personalization unit for personalizing the electronic book reader device.

50 Claims, 7 Drawing Sheets

(56) References Cited

U.S. PATENT DOCUMENTS

| | | | | |
|---|---|---|---|---|
| 6,341,270 | B1 | 1/2002 | Esposito et al. | |
| 6,393,298 | B1 | 5/2002 | Fulton | |
| 6,708,176 | B2 * | 3/2004 | Strunk et al. | |
| 6,879,825 | B1 | 4/2005 | Daly | |
| 6,915,272 | B1 | 7/2005 | Zilliacus et al. | |
| 6,947,922 | B1 | 9/2005 | Glance | |
| 6,997,379 | B2 | 2/2006 | Boyce et al. | |
| 7,009,596 | B2 | 3/2006 | Seet et al. | |
| 7,027,575 | B1 | 4/2006 | Burgess | |
| 7,167,840 | B1 | 1/2007 | Seidman et al. | |
| 7,216,092 | B1 * | 5/2007 | Weber et al. | 705/26 |
| 7,298,851 | B1 | 11/2007 | Hendricks et al. | |
| 7,304,635 | B2 | 12/2007 | Seet et al. | |
| 7,350,704 | B2 * | 4/2008 | Barsness | G06F 17/30716 235/375 |
| 7,421,155 | B2 * | 9/2008 | King | H04N 1/00244 382/312 |
| 7,441,047 | B2 * | 10/2008 | Gibbs | G06F 16/9577 709/248 |
| 7,444,148 | B1 | 10/2008 | Cook | |
| 7,610,365 | B1 * | 10/2009 | Kraft et al. | 709/223 |
| 7,694,874 | B2 | 4/2010 | Narasimhan et al. | |
| 8,028,893 | B1 | 10/2011 | Narasimhan et al. | |
| 8,438,633 | B1 * | 5/2013 | Backholm | G06Q 30/06 726/17 |
| 9,360,990 | B1 * | 6/2016 | Emigh | H04W 4/02 |
| 2002/0026347 | A1 | 2/2002 | Yanagino et al. | |
| 2002/0037724 | A1 | 3/2002 | Chatterjee et al. | |
| 2002/0066033 | A1 * | 5/2002 | Dobbins | G06Q 30/0277 726/4 |
| 2002/0073177 | A1 | 6/2002 | Clark et al. | |
| 2002/0101459 | A1 | 8/2002 | Herle et al. | |
| 2002/0107895 | A1 * | 8/2002 | Timmer | G06F 16/40 715/255 |
| 2002/0128984 | A1 | 9/2002 | Mehta et al. | |
| 2002/0149567 | A1 * | 10/2002 | Griffin | G06F 1/1626 345/169 |
| 2002/0165906 | A1 * | 11/2002 | Ricart et al. | 709/203 |
| 2002/0188499 | A1 * | 12/2002 | Jenkins | G06Q 10/087 705/28 |
| 2003/0200150 | A1 | 10/2003 | Westcott et al. | |
| 2004/0033797 | A1 | 2/2004 | Raivisto et al. | |
| 2004/0064369 | A1 | 4/2004 | Kato | |
| 2004/0138958 | A1 | 7/2004 | Watarai et al. | |
| 2004/0201633 | A1 * | 10/2004 | Barsness | G06F 16/34 715/864 |
| 2004/0242209 | A1 | 12/2004 | Kruis et al. | |
| 2005/0044047 | A1 * | 2/2005 | DeTreville | G06F 21/10 705/57 |
| 2005/0184975 | A1 * | 8/2005 | Sawada | G06F 1/1626 345/204 |
| 2005/0186942 | A1 | 8/2005 | Griffin | |
| 2006/0064344 | A1 | 3/2006 | Lidow | |
| 2006/0168123 | A1 | 7/2006 | Krstulich | |
| 2006/0218217 | A1 | 9/2006 | Ganesan et al. | |
| 2006/0259462 | A1 | 11/2006 | Timmons | |
| 2006/0281058 | A1 | 12/2006 | Mangoaela | |
| 2006/0282797 | A1 | 12/2006 | Barsness et al. | |
| 2007/0008566 | A1 * | 1/2007 | Leone, III | G06F 17/24 358/1.13 |
| 2007/0011061 | A1 | 1/2007 | East | |
| 2008/0164304 | A1 * | 7/2008 | Narasimhan et al. | 235/375 |
| 2008/0171532 | A1 | 7/2008 | Shieh et al. | |
| 2008/0212503 | A1 * | 9/2008 | Lipford | H04W 8/24 370/310 |
| 2009/0006583 | A1 * | 1/2009 | Kindle | G06F 17/30017 709/220 |

OTHER PUBLICATIONS

Canadian Office Action dated Sep. 21, 2017 for Canadian patent application No. 2680559, a counterpart foreign application of U.S. Appl. No. 11/693,212, 4 pages.

PCT Search Report for PCT Application No. PCT/US2008/057867, dated Aug. 7, 2008 (2 pages).

Non-Final Office Action for U.S. Appl. No. 13/252,043, dated Jul. 2, 2012, Subram Narasimhan et al, "Over-The-Air Device Provisioning and Activation ", 15 pages.

Canadian Office Action dated Nov. 22, 2016 for Canadian patent application No. 2680559, a counterpart foreign application of U.S. Appl. No. 11/693,212, 3 pages.

European Search Report dated Mar. 6, 2012 for European patent application No. 07870087.9, 15 pages.

Canadian Office Action dated Nov. 16, 2015 for Canadian patent application No. 2680559, a counterpart foreign application of U.S. Appl. No. 11/693,212, 4 pages.

European Office Action dated Feb. 8, 2017 for European Patent Application No. 07870087.9, a counterpart foreign application of U.S. Appl. No. 11/693,212, 7 pages.

Canandian Office Action dated Nov. 13, 2014 for Canadian patent application No. 2680559, a foreign counterpart of U.S. Appl. No. 11/693,212, 4 pages.

Office action for U.S. Appl. No. 13/252,043, dated Mar. 5, 2013, Narasimhan et al., "Over-The-Air Device Provisioning and Activation ", 21 pages.

PCT Search Report for PCT Application No. PCT/US2007/089123, dated Jun. 27, 2008 (12 pages).

* cited by examiner

PERSONALIZING HANDHELD ELECTRONIC BOOK READERS

CROSS-REFERENCE TO RELATED APPLICATIONS

This application claims the benefit of the filing date of U.S. Provisional Application Ser. No. 60/882,859, filed on 29 Dec. 2006, entitled "Personalizing Handheld Electronic Book Readers", to the fullest extent permitted by 35 U.S.C. § 119. The contents of this provisional application are incorporated by this reference as if set forth verbatim herein.

BACKGROUND

As handheld electronic book reader devices become more popular and widely accepted, early adopters of these devices may upgrade to newer, more capable versions of these readers. In some cases, customers who purchase a replacement may face the prospect of manually transferring content or information that they loaded into the previous device. Having to repeat previous effort may dissuade some customers from upgrading their devices, or from purchasing an electronic reader device at all.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
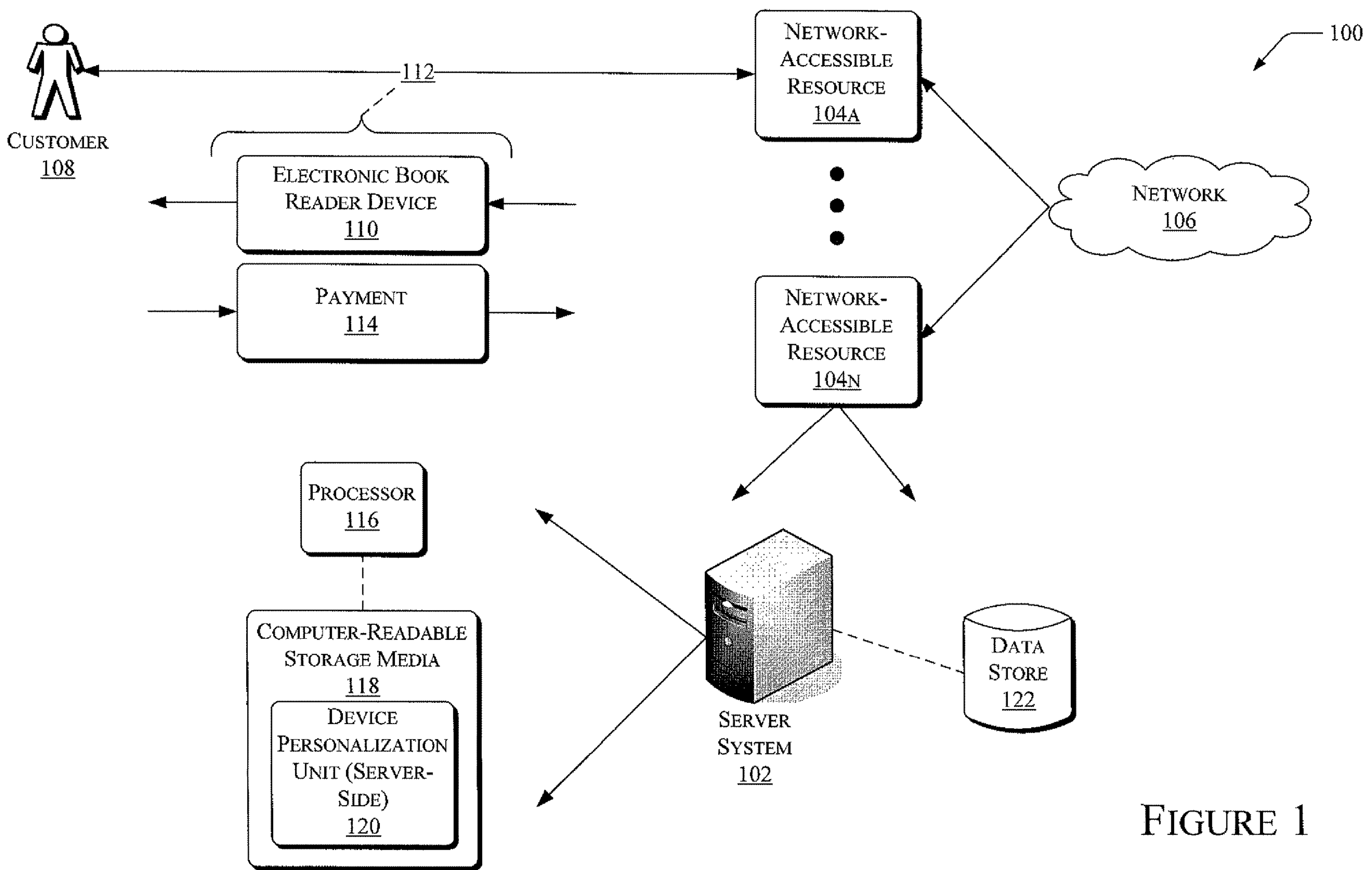
FIG. 1 is a block diagram illustrating components and data flows relating to illustrative operating environments for personalizing handheld electronic book readers.

This disclosure is directed to tools and techniques related to personalizing handheld electronic book readers. The description of these tools and techniques begins with an overview of illustrative operating environments for personalizing handheld electronic book readers, presented with FIG. 1.

Methods, systems, and computer-readable media (collectively, "tools" and/or "techniques") are described herein for personalizing handheld electronic book readers. The tools provide methods that include receiving an indication of a customer transaction involving an electronic book reader device. The methods may also receive an identifier associated with the customer, obtain personalization information associated with the identifier, and load the personalization information into the electronic book reader device. The tools also provide methods that include receiving a command that is input to the electronic book reader device, where the device has been personalized for the particular customer; and responding to the command using the personalization information. A server includes a processor and a computer-readable storage medium that includes a device personalization component for personalizing the electronic book reader device. The electronic book reader device includes a processor and computer-readable storage medium that includes a device personalization unit for personalizing the electronic book reader device.

For ease of description and understanding, but not to limit implementations of the description herein, the following terms are used herein with these definitions. Books distributed using electronic technologies are commonly referred to as electronic books ("eBooks"). The terms "eBook" and "digital work" are used synonymously and, as used herein, may include electronic or digital representations of printed works, as well as original electronic or digital content that may include text, multimedia, hypertext and/or hypermedia. Examples of eBooks and/or digital works include, but are not limited to, books, magazines, newspapers, periodicals, journals, reference materials, telephone books, textbooks, anthologies, instruction manuals, proceedings of meetings, forms, directories, maps, etc.

Typically, digital works are structured as virtual frames presented on a display device, and a user may turn or change from one virtual frame or "page" of electronic content to another. The term "page" as used herein refers to a collection of content that is presented at one time on a display. Thus, "pages" as described herein are not fixed permanently, and may be redefined or repaginated based on variances in display conditions, such as screen size, font type or size, margins, line spacing, resolution, or the like.

EBooks may be displayed and read on a variety of different display devices, such as computer monitors, portable digital assistants (PDAs), pocket personal computers (PCs), and specialized eBook reader devices, for example.

Also, while various aspects and features are described herein as applied to an eBook reader, the concepts may be implemented in other electronic devices or electronic readers besides eBook reader devices including, for example, personal computers, portable computers (e.g., laptops or pocket PCs), personal digital assistants (PDAs), portable gaming devices, wireless phones, and the like.

FIG. 1 illustrates components and data flows relating to illustrative operating environments 100 for personalizing handheld electronic book readers. The operating environments may include one or more systems 102 that include one or more servers or other suitable computer-based processing systems, as shown in FIG. 1. For ease of reference and discussion, but not limitation, this description refers to the system and the server 102 interchangeably.

The operating environments 100 may provide at least the servers 102 as part of infrastructure that supports one or more resources 104 that are accessible over a network 106. Examples of these network-accessible resources may include Internet websites. FIG. 1 shows two such network-accessible resources, denoted at 104*a* and 104*n*, but implementations of the operating environments may include any number of network-accessible resources.

In some implementations, the network-accessible resources may include merchant websites that offer goods and/or services (collectively and interchangeably referred to as "items") to customers 108. In the example shown in FIG.

1, such items may include an electronic book ("eBook") reader device, denoted at 110. In other possible implementations, the device 110 may take the form of wireless telephones or personal digital assistants (PDAs). Examples of the device 110 may also include portable media, video, or audio players, or the like.

FIG. 1 denotes interactions between the websites and the customers generally at 112, and these interactions may include the customers providing payments to or through the websites, in exchange for the eBook devices.

Having enabled the customers 108 to purchase the eBook devices, whether for themselves or for other persons, the websites may authorize one or more order fulfillment entities to deliver the eBook devices to the customers. For conciseness of illustration and description, FIG. 1 does not depict such order fulfillment entities, but instead illustrates the server system 102 generally. In so doing, it is understood that at least parts of the description of the server system 102 may be performed by such order fulfillment entities.

Turning to the server system 102 in more detail, the server may include one or more processors 116 that communicate with one or more instances of computer-readable storage media 118. The processors 116 may read data from or write data to portions of the computer-readable storage media 118 in performing any of the functions described herein. Additionally, the computer-readable storage media 118 may contain software instructions that, when loaded into the processors, cause the server to perform any of the functions described herein.

The storage media 118 may contain one or more software modules that define a device personalization unit 120, which represents a software-based implementation of suitable instructions for personalizing the handheld electronic book readers for particular customers 108. As will become clear from the description below, the device personalization unit 120 may be considered a server-side component that may cooperate with a corresponding client-side component residing on, for example, the handheld electronic book readers 110.

Figure 2:
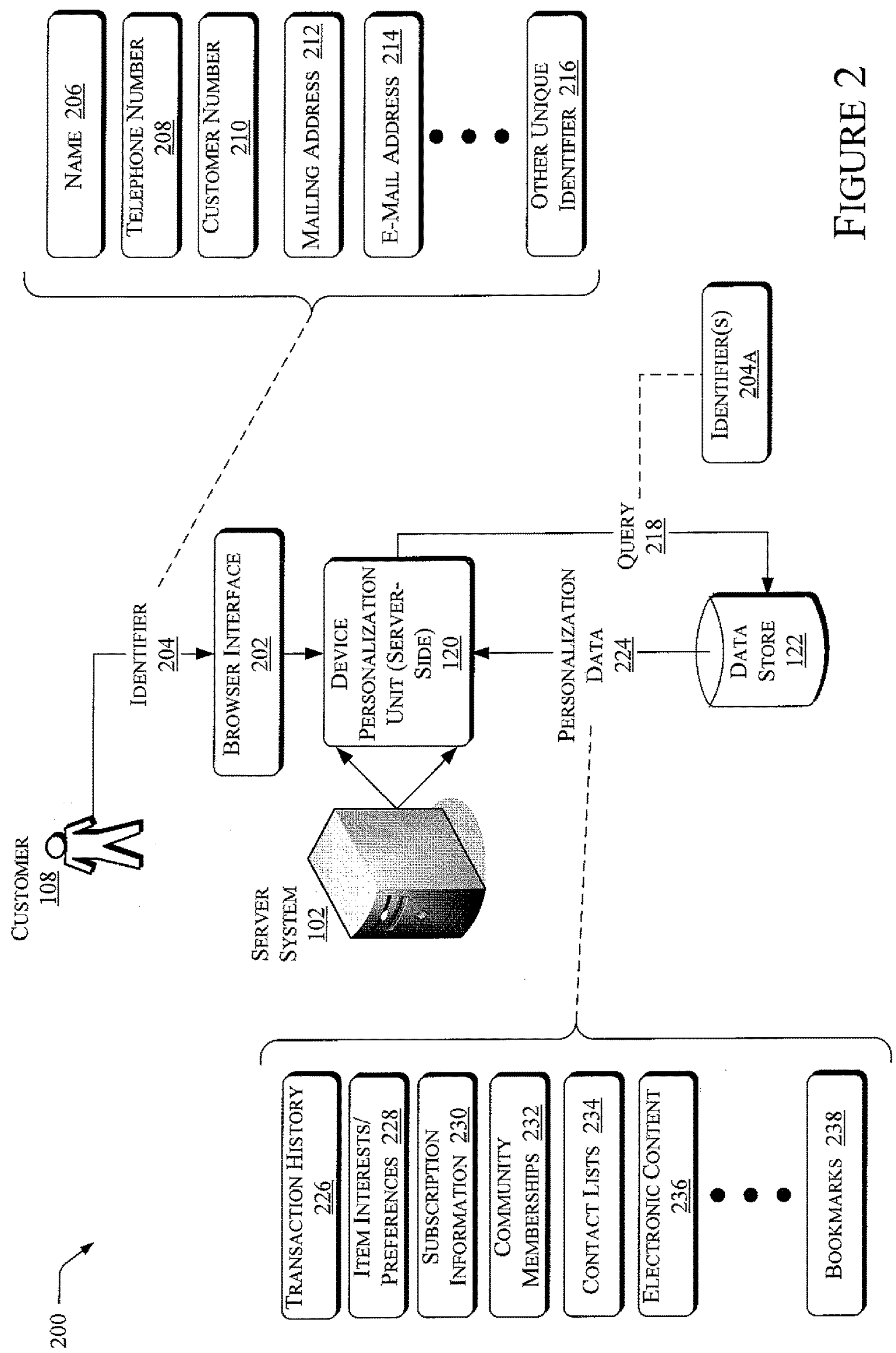
FIG. 2 is a block diagram illustrating server-side processes and data flows relating to personalizing handheld electronic book readers.

The device personalization unit 120 may interact with a data store 122 to personalize the handheld electronic book readers for the customers. The data store 122 may, for example, include a data base that houses information relating to particular customers, such that when a given customer orders an eBook device, the device personalization unit may personalize an eBook device for a particular given customer, and deliver the personalized eBook device to the customer. FIG. 2 now presents further details relating to ordering and personalizing the eBook devices.

FIG. 2 illustrates server-side processes and data flows 200 relating to personalizing handheld electronic book readers. For convenience but not limitation, some elements described above are carried forward into FIG. 2, and are denoted by the same reference numbers.

As described in FIG. 1, the server system 102 may include a device personalization unit 120 that enables the system to personalize handheld electronic book readers for particular customers 108. Assuming the personalization unit is implemented in connection with a website, for example, the personalization unit may populate a browser interface 202 that facilitates interaction with the customer. More specifically, the browser interface 202 may enable the customer to provide one or more identifiers relating to the customer. FIG. 2 denotes these identifiers generally at 204.

In some instances, the customer 108 who is ordering the eBook device may be the same customer who receives and uses the eBook device. In this case, the customer 108 may provide identifiers 204 for himself or herself. However, in other instances, the customer 108 who is ordering the eBook device may not be the same customer who receives and uses the eBook device. For example, the customer 108 may be ordering the eBook device as a gift for someone else. In these latter cases, the server system 102 may prompt the customer 108 to indicate whether the eBook device is intended for the customer 108, or for another person. If the eBook device is intended for another person, the server system 102 may direct the customer to provide identifiers 204 for the intended recipient of the eBook device.

For illustration only and not limitation, FIG. 2 lists several examples of the identifiers 204 that may be collected from the customer. Implementations of the operating environments described may include one or more, but not necessarily all, of these examples. A name field 206 may indicate the name of the customer. A telephone number field 208 may indicate a landline or wireless telephone number associated with the customer. This field 208 may also indicate IP addresses for those customers who use voice-over-IP (VoIP) technology. A field 210 may contain data representing a customer number that identifies records associated with the customer, as maintained by a website. A mailing address field 212 may contain data representing a delivery address for shipping the eBook device to the customer. An e-mail address field 214 may contain data representing an e-mail address for the customer. A field 216 may contain any other data suitable for uniquely identifying the customer.

In some instances, the customer 108 may be a repeat customer of the website, and the website may have records of previous dealings with the customer. More specifically, a data store (e.g., the data store 122) may contain these records. In these instances, the device personalization unit 120 may query these records to obtain information used to personalize the eBook reader ordered by the customer. FIG. 2 generally represents these queries at 218. The queries 218 may include at least one or more of the identifiers obtained from the customer as indexes or search keys. FIG. 2 denotes the identifiers as included in the queries at 204*a*.

The data store 122 may search its records for any data matching the search criteria specified in the queries 218. If the data store contains any records matching the search criteria specified in the query 218, the data store may return these records in response to the query. FIG. 2 generally denotes these responses as personalization data 224.

The personalization data 224 may include one or more of the example fields shown in FIG. 2. A transaction history field 226 may contain data representing previous transactions involving the customer 108. These previous transactions may include previous purchases, inquiries about items, requests for information, or the like. An interests/preferences field 228 may contain data representing particular areas of interest to the customer, whether expressly specified or inferred from previous interactions. A subscription information field 230 may indicate any publications to which the customer subscribes, whether in printed or electronic form. A community memberships field 232 may indicate any groups (e.g., online discussion groups) of which the customer is a member. A contact list field 234 may contain one or more address book entries associated with the customer 108. A content field 236 may contain digital or electronic content that the customer may access using the eBook device (e.g., 114). Such content may include electronic books licensed by the customer, or electronic articles or periodicals to which the customer subscribes. A bookmarks field 238 may indicate any bookmarks inserted in electronic content by the customer.

It is noted that any of the fields 226-238 could contain the information described herein, or may contain pointers to where that information is stored. It is also noted that in some instances, the customer 108 may be obtaining the eBook device as a replacement for a previous eBook device or other electronic device. In these instances, one or more of the fields 226-238 may have been populated using the previous device, and the device personalization unit 120 may transfer one or more of these fields to the new device. In this manner, the device personalization unit may enable a seamless experience for the customer in transitioning from the previous device to the new device.

Without loss of generality, examples of the personalization data may include information that is loaded onto the previous device after the previous device has been delivered to the customer. The personalization data may include information and/or content that the customer specifically selects for loading onto the device. On at least these bases, the personalization data is distinguished from information related to providing local number portability (LNP) capability in the context of telecommunications services.

In cases in which the customer is new to the website, the device personalization unit may prompt the customer for at least some of the information described in the fields 226-238. If the customer provides any information in response to these prompts, the device personalization unit may store this information in the appropriate fields 226-238. In turn, the device personalization unit may use at least some of this information to personalize the eBook device for the customer.

Figure 3:
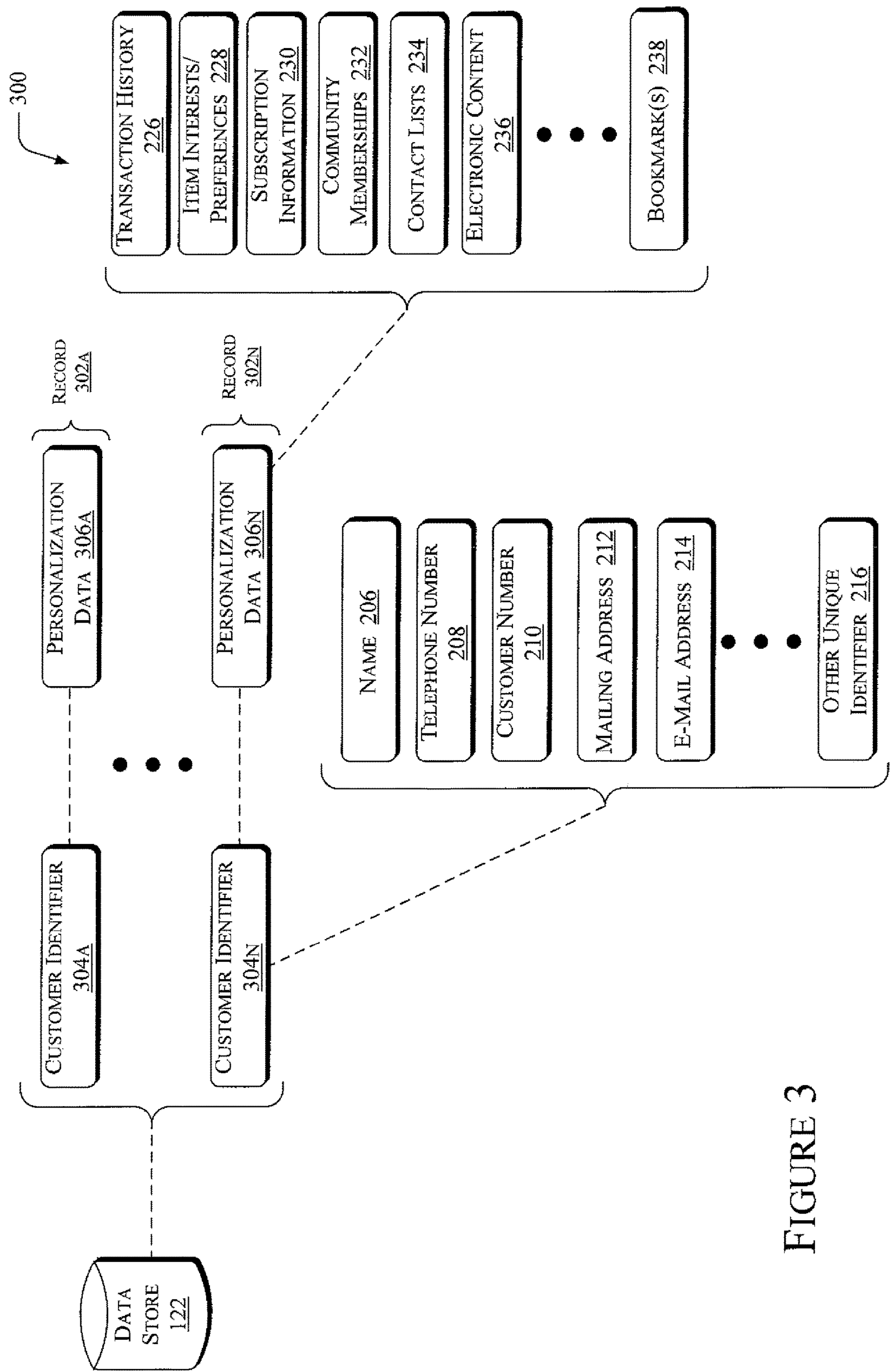
FIG. 3 is a block diagram illustrating data structures suitable for personalizing handheld electronic book readers.

Having described the processes and data flows relating to personalizing handheld electronic book readers in FIG. 2, the discussion now turns to a description of data structures that may be suitable for implementing the data store, now presented with FIG. 3.

FIG. 3 illustrates data structures 300 suitable for personalizing handheld electronic book readers. For convenience but not limitation, some elements described above are carried forward into FIG. 3, and are denoted by the same reference numbers.

An example of the data store is carried forward at 122. The data store may include a plurality of records 302. The records 302 may, for example, contain information relating to respective different customers (e.g., 108 in FIG. 1). FIG. 3 shows two examples of the records 302, denoted at **302*a* and 302*n***. However, it is noted that the data store may contain any number of records, depending on how many customers have information contained in the data store.

Turning to the records 302 in more detail, for convenience, FIG. 3 shows these records as organized by customer identifier fields 304 and by personalization data fields 306. FIG. 3 shows two examples of the customer identifier fields, denoted at **304*a* and 304*n*, and shows two examples of the personalization data fields, denoted at 306*a* and 306*n***.

The customer identifier fields 304 contain any information pertaining to the customers that may serve as search keys or indexes when querying the data store 122. For example, the identifiers 204 obtained from the customers as shown in FIG. 2 may correspond to the customer identifier fields 304. Accordingly, the customer identifier fields 304 may contain at least one of the subfields 206-216, as illustrated in FIG. 3.

The personalization data fields 306 may contain any information used to personalize the eBook reader for a particular customer. In some instances, the data stored in the customer identifier fields 304 and the personalization data fields 306 may overlap. In other words, searchable data may also be loaded onto the eBook reader to personalize the device. The personalization data 224 as shown in FIG. 2 may correspond to the personalization data fields 306. Accordingly, the personalization data fields 306 may contain at least one of the subfields 226-238, as illustrated in FIG. 3.

Figure 4:
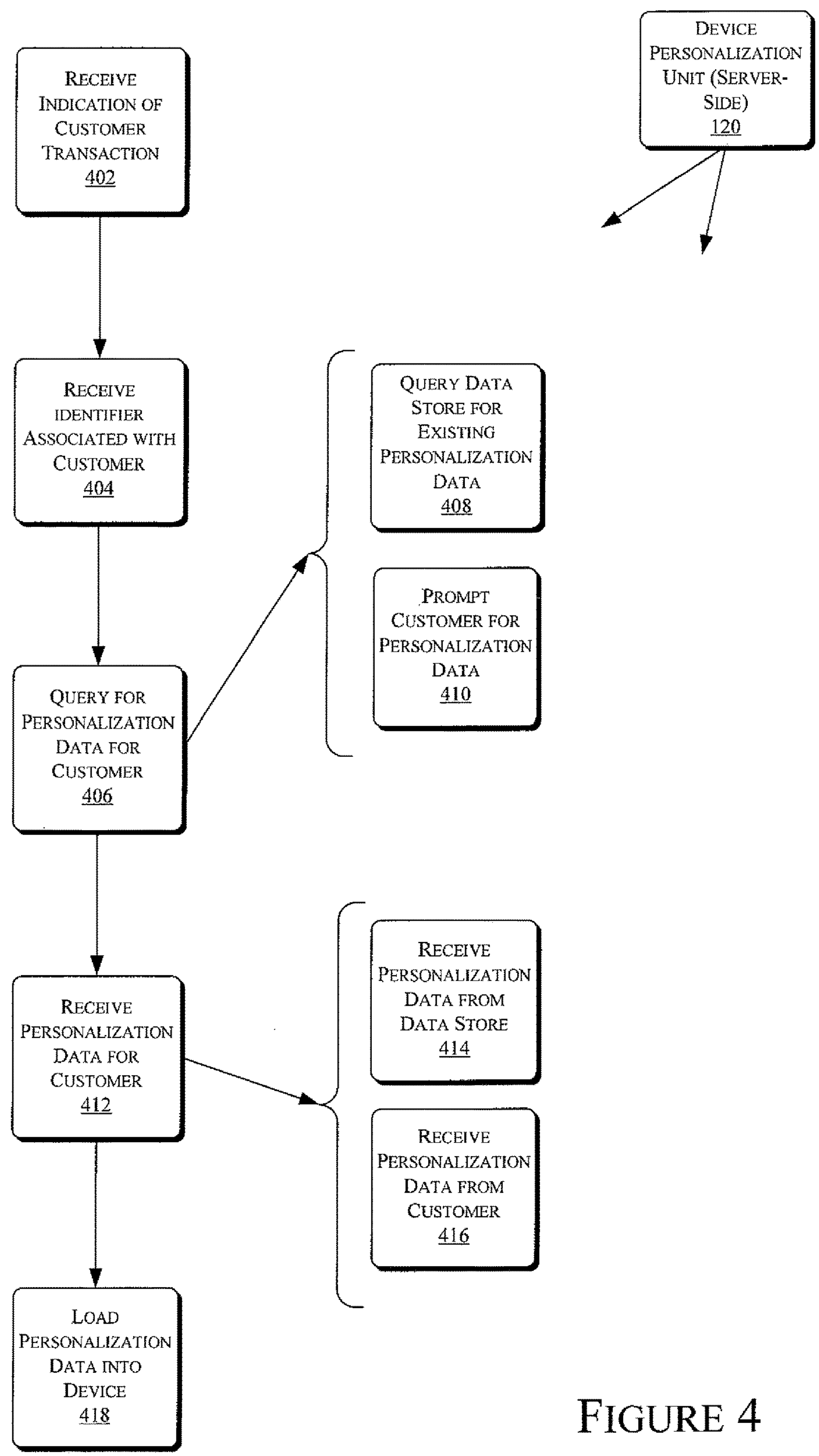
FIG. 4 is a block diagram illustrating process flows for personalizing handheld electronic book readers.

Having described the data structures 300 in FIG. 3, the discussion now turns to a description of server-side process flows for personalizing handheld electronic book readers, now presented with FIG. 4.

FIG. 4 illustrates process flows 400 for personalizing handheld electronic book readers. While these process flows 400 are described here as being performed by certain systems and components, such as the server 102 and the device personalization unit 120, other systems and components may also perform at least parts of the process flows 400 without departing from the spirit and scope of the description herein. For convenience but not limitation, some elements described above are carried forward into FIG. 4, and are denoted by the same reference numbers.

Block 402 represents receiving an indication of a customer interaction with, for example, a website hosted on the server system 102. This customer interaction may involve a customer (e.g., 108 in FIG. 1) purchasing or inquiring about an eBook device (e.g., 110 in FIG. 1) through the website.

Block 404 represents receiving one or more identifiers associated with the customer. FIG. 2 shows examples of such identifiers at 204. Generally, these identifiers may take any form suitable to enable the process 400 to determine the identity of the customer, to personalize the eBook device with information for the appropriate person. FIGS. 2 and 3 provide non-limiting examples of such identifiers at 206-216.

Block 406 represents querying for personalization data relating to the customer whose identifier was received in block 404. In some instances, block 406 may include querying a data store (e.g., 122 in FIG. 1) for any records pertaining to a particular customer, as denoted at block 408. In other instances, block 406 may include prompting the customer for at least some of this personalization data, as denoted at block 410.

Block 412 represents receiving personalization data for a particular customer. In different possible scenarios, block 412 may include receiving at least some personalization data from the data store, as represented in block 414. In addition to, or instead of, the personalization data received from the data store, block 408 may include receiving at least some personalization data directly from the customer, as represented in block 416. Block 416 may include receiving the personalization data in response to the prompting represented in block 410.

In transactions involving new customers, the data store may not contain any personalization data or other information pertaining to these new customers. In these transactions, the personalization data may primarily include information obtained directly from the customer. In other transactions involving existing customers, the personalization data may include only information queried from the data store. In other cases, the process flow 400 may include supplementing or clarifying information from the data store, as appropriate, through interaction with the customer.

Block 416 represents loading the personalization data into an eBook device to be personalized. The previous Figures show examples of such devices at 110. In addition, FIGS. 2 and 3 provide non-limiting examples of such personalization data at 226-238.

Figure 5:
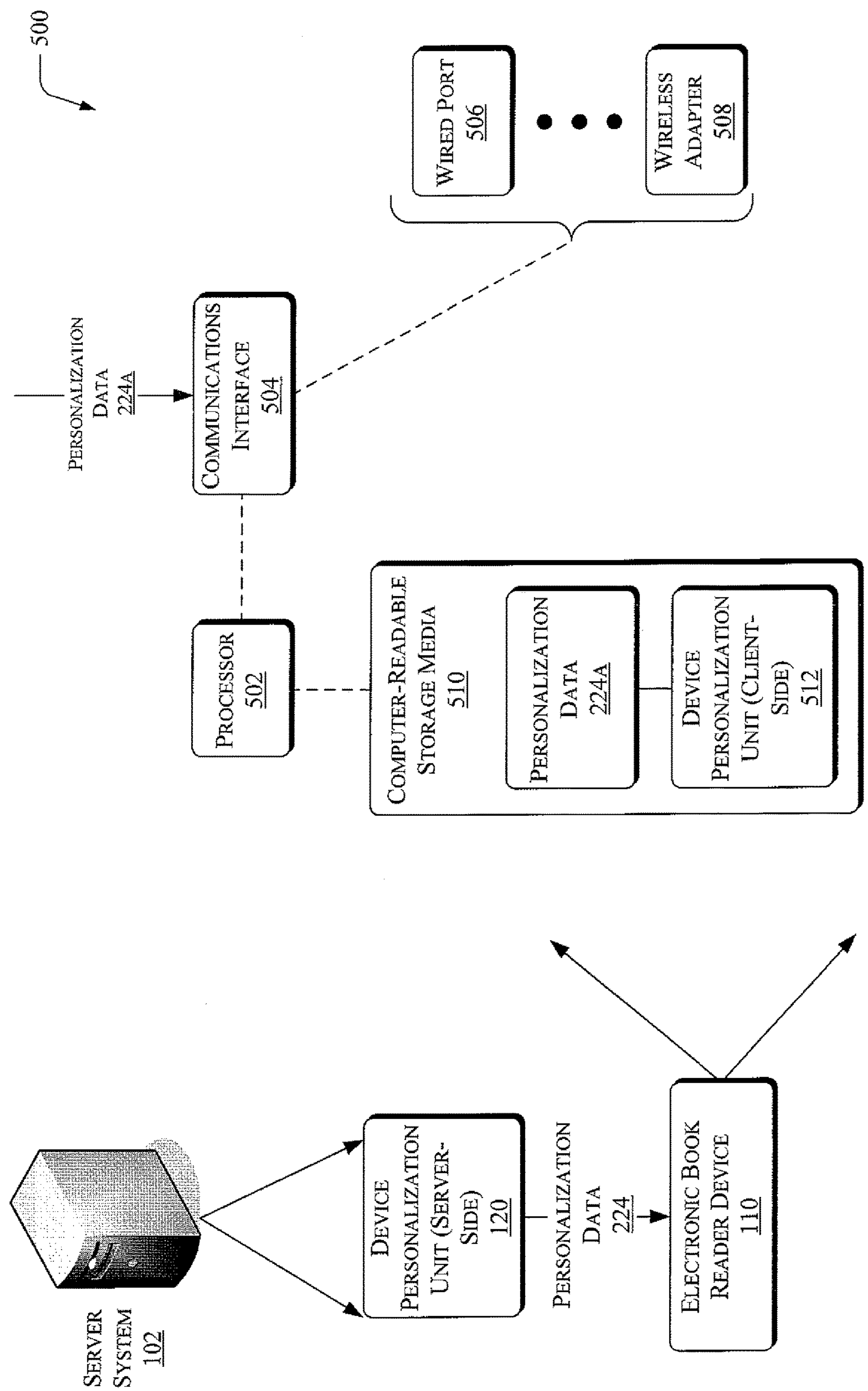
FIG. 5 is a block diagram illustrating client-side components and data flows relating to personalizing an electronic book reader (eBook) device.

Having described the server-side process flows 400 in FIG. 4, the discussion now proceeds to a description of components and data flows relating to the electronic book reader (eBook) device, now presented in FIG. 5.

FIG. 5 illustrates client-side components and data flows 500 relating to personalizing an electronic book reader (eBook) device. For convenience but not limitation, some elements described above are carried forward into FIG. 5, and are denoted by the same reference numbers.

As described above, the server system 102 may include the device personalization unit 120, which may function as a server-side component that loads personalization data (e.g., 224) into the electronic book reader (eBook) device (e.g., 110).

Turning to the eBook device 110 in more detail, it may include a processor 502 coupled to a communications interface 504. In some implementations, the communications interface 504 may include one or more connectors, ports, adapters, and related driver software for a wired network (e.g., a local area network) or a universal serial bus (USB) port, denoted generally at 506. In other implementations, the communications interface 404 may include adapters and related drivers for a wireless interface (e.g., a WiFi interface), denoted generally at 508.

Through the communications interface 504, the eBook device 110 may receive the personalization data from the server system 102, as represented at 224*a*. Additionally, the eBook device 110 may include one or more computer-readable storage media 510, which may store the personalization data 224 as received from the server system 102. The computer-readable storage media 510 may also include a device personalization unit 512, which may provide a client-side counterpart to the device personalization unit 120 that resides on the server system 102. As such, the device personalization unit 512 may include a set of computer-readable instructions that, when loaded into the processor 502 and executed, cause the eBook device 110 to perform any of the functions attributed herein to the eBook device. As detailed further below, the device personalization unit 512 may load and process the personalization data to cause the eBook device to, for example, present customer-specific information.

Figure 6:
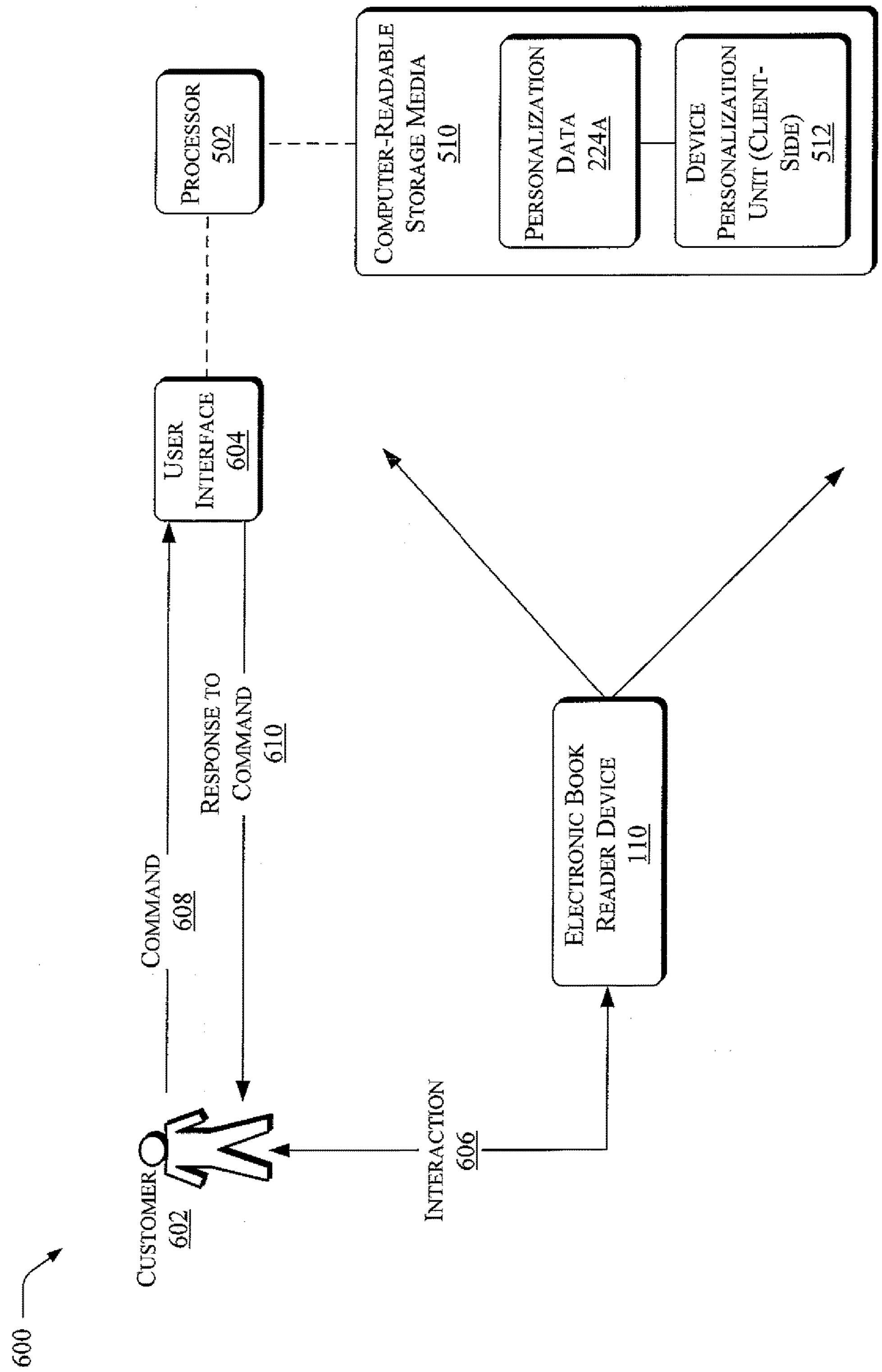
FIG. 6 is a block diagram illustrating components and data flows relating to customer interactions with the eBook device.

Having described components and data flows 500 relating to the eBook device in FIG. 5, the discussion now turns to a description of customer interactions with the eBook device, now presented in FIG. 6.

FIG. 6 illustrates components and data flows 600 relating to customer interactions with the eBook device. For convenience but not limitation, some elements described above are carried forward into FIG. 6, and are denoted by the same reference numbers.

FIG. 6 shows an example of the eBook device at 110, carried forward from previous drawings. A customer, denoted generally at 602, may receive the eBook device. The customer 602 shown in FIG. 1 may or may not be the same customer (e.g., 108 in FIG. 1) who ordered the eBook device. In an example described above, the customer 108 may order the eBook device as a gift for another person, who may be the customer 602 shown in FIG. 6.

The eBook device may include one or more processors 502 and one or more computer readable storage media 510, carried forward from FIG. 5. The computer readable storage media 510 as shown in FIG. 6 may contain the personalization data 224*a*, and the device personalization unit 512, also carried forward from previous Figures, for ease of reference, but not limitation.

The eBook device may also include a user interface 604 that is coupled to communicate with the processor 502 and the computer readable storage media 510. The user interface 604 may include output components, such as one or more display screens for presenting visual information visually to the customer 602, and/or one or more speakers or the other devices for providing audible information to the customer. The user interface 604 may include input components, such as one or more touch-sensitive panels or displays, rotary input devices (e.g., trackballs), pointers, mice, keyboards or keypads, or the like.

Having received the eBook device, the customer 602 may interact with the eBook device through the user interface 604, with these interactions denoted generally at 606. These interactions 606 may include one or more commands 608 that are issued by the customer to the eBook device. The customer may provide these commands using any feature of the user interface 604. The eBook device processes the commands from the customer, and provides responses 610 thereto. More specifically, the device personalization unit 512 may process these commands and generate output to the customer in response to the commands, based on the personalization data 224*a*.

Figure 7:
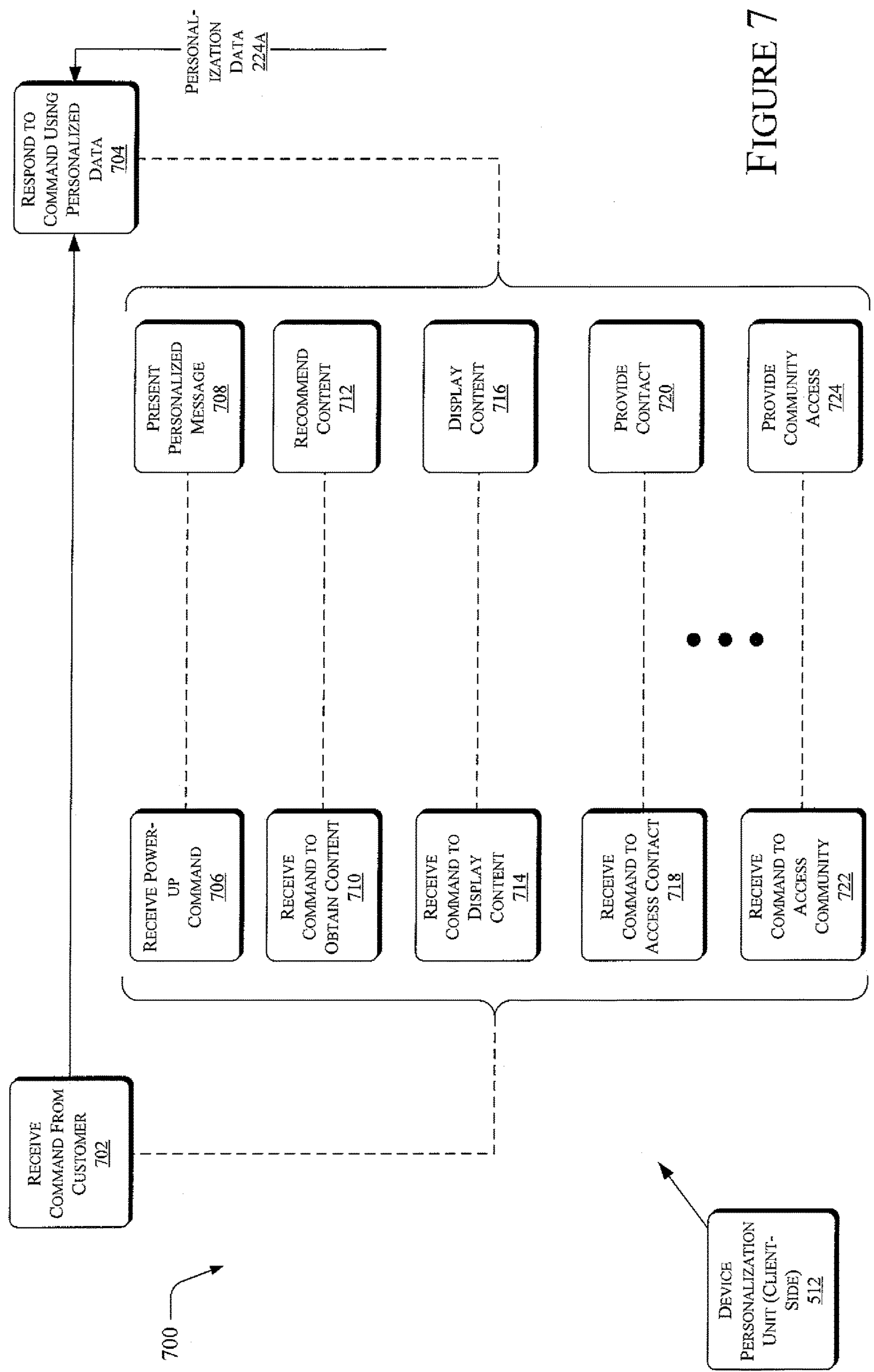
FIG. 7 is a block diagram illustrating process flows related to example customer interactions with the eBook device.

Having described the components and data flows 600 relating to customer interactions with the eBook device in FIG. 6, the discussion now proceeds to a description of process flows related to example customer interactions with the eBook device, now presented in FIG. 7.

FIG. 7 illustrates process flows 700 related to example customer interactions with the eBook device. For convenience but not limitation, some elements described above are carried forward into FIG. 7, and are denoted by the same reference numbers. Additionally, while these process flows 700 are described here as being performed by certain systems and components, such as the server 102 and the client-side device personalization unit 512, other systems and components may also perform at least part of the process flow 700 without departing from the spirit and scope of the description herein.

Block 702 represents receiving a command from a customer using the ebook device (e.g., 602 in FIG. 6). Block 702 may include receiving the command through a user interface (e.g., 604 in FIG. 6).

Block 704 represents responding to the command received in block 702, using personalized data specific to the customer using the eBook device. The previous Figures provide examples of the personalized data at 224*a*, which is carried forward into FIG. 7 for ease of reference, but not limitation.

FIG. 7 also provides several non-limiting examples of commands and responses that the personalized data 224*a* may facilitate. These examples are provided only for ease of understanding, and do not limit possible implementations of the description herein.

Block 706 represents receiving a command to power-up the eBook device. For example, the user may have activated an on-off button provided by the eBook device. In response to the power-up command, as represented by block 708, the eBook device may present a personalized message to the customer, using a name of the customer as indicated in the personalization data. For example only, the eBook device may display a welcome message that includes text such as: "Hello Mr. Davis, congratulations on your purchase!"

Block 708 may include displaying the welcome message each time the device is powered-up, or may include displaying the message only the first time that the device is powered-up. In some instances, block 708 may include displaying a message such as the one above only the first time the device is powered-up, but displaying other personalized messages afterwards.

Block 710 represents receiving a command to obtain content for display on the eBook device. For example, the user may request content stored in an older eBook device and transitioned to the new eBook device (e.g., electronic content at 236 in FIG. 2). As another example, the user may begin searching for content of possible interest, for downloading to the eBook device.

In response to such a command, or asynchronously therewith, block 712 represents recommending or providing content to the customer. As noted above, this content may include content stored on a previous eBook device and copied to the new eBook device. In this example, block 712 may include incorporating any previous bookmarks or annotations inserted by the customer (e.g., 238 in FIG. 2). Additionally, block 712 may include transferring any subscriptions by which the customer may access articles or periodicals (e.g., 230 in FIG. 2).

In other instances, block 712 may include analyzing previous transaction history involving the customer (e.g., 226 in FIG. 2) to determine what content may be of interest to the customer. Block 712 may include recommending any content identified by this analysis for consideration by the customer.

Additionally, block 712 may include analyzing any information indicating item preferences or items of interest to the customer, whether expressly specified by the customer, or inferred from previous customer activity. FIG. 2 shows examples of this information at 228. Block 712 may include recommending any content resulting from this analysis as well.

Block 714 represents receiving a command to display content on the eBook device. For example, the customer may select a particular instance of content for display on the eBook device. Examples of content may include electronic or digital representations of text.

Block 716 represents displaying the content requested by the customer. The eBook device may enable the customer to specify a zoom level at which the eBook device may render these representations of text for viewing by the customer. These zoom levels may be set on a per-content basis, or may apply globally to any content displayed on the eBook device.

In cases where the customer is replacing a previous eBook device with another eBook device, these zoom levels may be incorporated into the preference information (e.g., 228) and transferred to the new eBook device. In this manner, block 716 may include enabling the customer to continue viewing content using the same settings specified on the previous device, thereby providing a more seamless transition from the previous device to a replacement device.

Block 718 represents receiving a command to access a contact. For example, block 718 may include receiving a request from the customer to access one or more contacts in an address book or contact list. Also, block 718 may include receiving a request to access the address book or contact list as a whole, rather than entries contained therein.

Block 720 represents providing the contact information requested in block 718. In instances in which the customer obtains the eBook device as a replacement for a previous device, block 720 may include sending entries from an address book or contact list on the previous device. This address book or contact list from the previous device may be included in the personalization data loaded onto the new device. FIG. 2 shows examples of this address book or contact list or contact information at 234.

Block 722 represents receiving a command to access a community or other group construct of which the customer is a member. If the customer is a member of more than one such community, block 722 may include receiving an indication of which community the customer wishes to access. In some instances, block 722 may include receiving a request to list the communities of which the customer is a member, or to list all communities that the customer may join.

Block 724 represents providing the customer access to the community requested in block 722. As discussed above with the contact list information, in cases where the customer obtains the eBook device as a replacement for a previous eBook device, the personalization data may include the community membership information from the previous eBook device (e.g., at 232 in FIG. 2). In this manner, this previous community membership information may be transferred to the new eBook device, enabling the customer to access his or her communities or groups without manually reloading this information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

under control of one or more computer systems configured with executable instructions, receiving, by a first personalization component stored on a first non-transitory computer-readable storage medium of the one or more computing systems, an indication that a customer device associated with a first customer has accessed an Internet web site through which an electronic book reader device is offered;

receiving, by the first personalization component, an order for the electronic book reader device from the customer device associated with the first customer, the electronic book reader device being a replacement for a previous electronic book reader device owned by a second customer, and wherein the customer device is different from both the electronic book reader device and the previous electronic book reader device;

providing, by the first personalization component, to the customer device a prompt for an identifier associated with the second customer and first personalization information associated with the second customer;

receiving, by the first personalization component and based on the prompt, the identifier associated with the second customer and the first personalization information;

obtaining, by the first personalization component, second personalization information associated with the identifier, the second personalization information including data associated with the previous electronic book reader device; and transmitting, by the first personalization component and based on the first personalization information and the second personalization information, content to a second personalization component stored on a second non-transitory computer-readable storage medium of the electronic book reader device, wherein the second personalization component is configured to cause one or more processors of the electronic book reader device to perform one or more actions to transform, based at least on the content and before a first use of the electronic book reader device by the second customer, the electronic book reader device into a personalized electronic book reader device.

2. The method of claim 1, wherein the receiving the identifier includes receiving at least one of:
a name associated with the second customer;
a telephone number associated with the second customer;
a customer number associated with the second customer;
a mailing address associated with the second customer; or
an e-mail address associated with the second customer.

3. The method of claim 1, further comprising querying for the second personalization information associated with the second customer.

4. The method of claim 3, wherein the querying for the second personalization information includes querying a data store for existing second personalization information associated with the second customer.

5. The method of claim 1, wherein the obtaining the second personalization information includes receiving the second personalization information from a data store.

6. The method of claim 1, wherein the obtaining the second personalization information includes receiving the second personalization information from the second customer.

7. The method of claim 1, wherein the obtaining the second personalization information includes obtaining at least one of:
transaction history associated with the second customer;
information representing item preferences associated with the second customer;
subscription information associated with the second customer;
community membership information associated with the second customer;
contact list information associated with the second customer;
electronic content associated with the second customer; or
bookmark information associated with the second customer.

8. At least one non-transitory computer-readable storage medium containing computer-executable instructions for performing the method of claim 1.

9. A method comprising:
under control of one or more computer systems configured with executable instructions,
receiving, by a first personalization component stored on a first non-transitory computer-readable storage medium of the one or more computing systems, a first indication that a customer device associated with a first customer has accessed an Internet website through which an electronic device is offered;
receiving, by the first personalization component and in association with the first indication, a second indication of a customer transaction with the first customer and via the Internet website, the customer transaction involving upgrading to the electronic device;
providing, by the first personalization component to the customer device and in association with the second indication, a prompt for an identifier associated with a second customer and first personal information associated with the second customer;
receiving, by the first personalization component, the identifier associated with a second customer and first personal information, wherein the first customer is different from the second customer;
obtaining, by the first personalization component, second personal information of the second customer based at least in part on the receiving of the identifier, the second personal information including:
at least one content item previously associated with the second customer and selected by the second customer for loading into the electronic device, and
data associated with a previous electronic device associated with the second customer; and
transmitting, by the first personalization component and based on the first personalization and the second personal information of the second customer, content to a second personalization component stored on a second non-transitory computer-readable storage medium of the electronic device, wherein the second personalization component is configured to cause one or more processors of the first electronic device to perform one or more actions to transform, based at least in part on the content and before a first use of the electronic device by the second customer, the first electronic device into a personalized electronic device.

10. The method of claim 9, wherein the electronic device is an electronic book reader device.

11. The method of claim 9, further comprising querying for the second personal information associated with the second customer.

12. The method of claim 11, wherein the querying for the second personal information includes querying a data store for existing personal identification information associated with the second customer.

13. The method of claim 11, wherein the querying for the second personal information includes prompting the second customer to provide the second personal information.

14. The method of claim 9, wherein the obtaining the second personal information includes receiving the second personal information from a data store.

15. The method of claim 9, wherein the obtaining the second personal information includes receiving the second personal information from the second customer.

16. A method comprising:
under control of one or more computer systems configured with executable instructions,
receiving, by a first personalization component stored on a first non-transitory computer-readable storage medium of an electronic book reader device that has been personalized for a customer prior to a first use of the electronic book reader device by the customer, a first command to power on the electronic book reader device;
responding, by the first personalization component, to the first command by causing one or more processors of the electronic book reader device to present a first personalized welcome message on the electronic book reader device to the customer, the first personalized welcome message including personalization information that is loaded into the electronic book reader device from a previous version of the electronic book reader device prior to the first use of the electronic book reader device by the customer;
receiving, by the first personalization component, a second command to power-up the electronic book reader device subsequent to the first use of the electronic book reader device by the customer; and
responding, by the first personalization component, to the second command by causing the one or more processors of the electronic book reader device to present a second personalized welcome message on the electronic book reader device to the customer, the second personalized welcome message being different from the first personalized welcome message.

17. The method of claim 16, wherein the receiving the first command includes receiving a content command to obtain content for loading onto the electronic book reader device.

18. The method of claim 16, wherein the receiving the first command includes receiving a display command to display content on the electronic book reader device.

19. The method of claim 16, wherein the receiving the first command includes receiving an access command to access at least one instance of contact information loaded onto the electronic book reader device and associated with the customer.

20. The method of claim 16, wherein the responding to the first command includes recommending content to the customer based on the personalization information.

21. The method of claim 16, wherein the responding to the first command includes displaying content via a display of the electronic book reader device based on the personalization information.

22. The method of claim 16, wherein the responding to the first command includes providing at least one instance of contact information to the customer based on the personalization information.

23. The method of claim 16, wherein the responding to the first command includes providing access to a community associated with the customer based on the personalization information.

24. At least one non-transitory computer-readable storage medium containing computer-executable instructions for performing the method of claim 16.

25. A system comprising:

a server including at least one processor and at least one computer-readable storage medium, wherein the computer-readable storage medium includes a first personalization component for:

providing, by the first personalization component and to a customer device, a browser interface for interacting with a first customer, the browser interface to conduct a transaction with the first customer and to offer a first electronic book reader device in the transaction;

providing, by the first personalization component, to the customer device a prompt for an identifier associated with a second customer and personal information associated with the second customer;

receiving, by the first personalization component and based on the prompt, an identifier associated with the second customer and the personal information; and transmitting, by the first personalization component and to a second personalization component stored on the first electronic book reader device, the identifier and the personal information, wherein the second personalization component is configured to cause one or more processors of the first electronic book reader device to perform one or more actions to transform the first electronic book reader device into a personalized electronic book reader device for the second customer before the first electronic book reader device is provided to the second customer, the second personalization component personalizing the first electronic book reader device according to data associated with a second electronic book reader device associated with the second customer, the data including at least one of:

an electronic book previously licensed by the second customer, an electronic article, or an electronic periodical previously subscribed to by the second customer, the first electronic book reader device being a replacement for the second electronic book reader device, and the customer device being different from both the first electronic book reader device and the second electronic book reader device.

26. The system of claim 25, wherein the first personalization component receives at least one additional identifier from the first customer.

27. The system of claim 25, wherein the first personalization component queries for additional personalization information associated with at least one identifier received from the first customer.

28. The system of claim 25, wherein the first personalization component obtains additional personalization information from a data store, based on the identifier received from the first customer.

29. The system of claim 25, wherein the first personalization component obtains additional personalization information from the second customer.

30. The system of claim 25, wherein the identifier includes at least one of:

a name associated with the second customer;

a telephone number associated with the second customer;

a customer number associated with the second customer;

a mailing address associated with the second customer; or an e-mail address associated with the second customer.

31. The system of claim 25, wherein the first personalization component obtains additional personalization information including at least one of:

transaction history associated with the second customer;

information representing item preferences associated with the second customer;

subscription information associated with the second customer;

community membership information associated with the second customer;

contact list information associated with the second customer;

electronic content associated with the second customer; or bookmark information associated with the second customer.

32. An electronic book reader device comprising:

at least one processor and at least one non-transitory computer-readable storage medium, wherein the at least one non-transitory computer-readable storage medium includes:

a first personalization component for personalizing the electronic book reader device for a customer at least in part on personalization data stored on a previous device associated with the customer prior to a first use of the electronic book reader device by the customer, the personalization data including community membership information associated with the customer and having been received from a second personalization component stored by a device personalization service, first instructions for presenting a first personalized message to the customer, wherein the first personalized message is generated based on the personalization data, and wherein the first personalized message is presented upon first powering up the electronic book reader device; and second instructions for presenting a second personalized message to the customer, wherein the second personalized message is generated based on the personalization data, and wherein the second personalized message is presented subsequent to the first use of the electronic book reader device.

33. The electronic book reader device of claim 32, wherein the at least one non-transitory computer-readable storage medium includes computer-executable instructions for receiving a command to power-up the electronic book reader device.

34. The electronic book reader device of claim 32, wherein the at least one non-transitory computer-readable storage medium includes computer-executable instructions for receiving a command to obtain content for loading onto the electronic book reader device.

35. The electronic book reader device of claim 32, wherein the at least one non-transitory computer-readable storage medium includes computer-executable instructions for receiving a command to display content on the electronic book reader device.

36. The electronic book reader device of claim 32, wherein the at least one non-transitory computer-readable storage medium includes computer-executable instructions for receiving a command to access at least one instance of contact information loaded onto the electronic book reader device and associated with the customer.

37. The electronic book reader device of claim 32, wherein the at least one non-transitory computer-readable storage medium includes computer-executable instructions for receiving a command to access a community associated with the customer.

38. The electronic book reader device of claim 32, wherein the at least one non-transitory computer-readable storage medium includes computer-executable instructions for recommending content to the customer based on the personalization data.

39. The electronic book reader device of claim 32, wherein the at least one non-transitory computer-readable storage medium includes computer-executable instructions for displaying content to the customer based on the personalization data.

40. The electronic book reader device of claim 32, wherein the at least one non-transitory computer-readable storage medium includes computer-executable instructions for providing at least one instance of contact information to the customer based on the personalization data.

41. The electronic book reader device of claim 32, wherein the at least one non-transitory computer-readable storage medium includes computer-executable instructions for providing access to a community associated with the customer based on the personalization data.

42. A data store for personalizing an electronic book reader device for a customer, the data store embodied on a non-transitory computer-readable storage medium and comprising:

a plurality of customer identifier records, wherein the plurality of customer identifier records comprise at least one field that is searchable using at least one identifier associated with a first customer obtained from a second customer as part of an online transaction to upgrade an electronic book reader device associated with the first customer; and a plurality of personalization data records for personalizing the electronic book reader device for the first customer before the electronic book reader device is provided to the first customer, wherein one or more personalization data records of the plurality of personalization data records are obtained from the second customer as part of the online transaction to write data to the electronic book reader device associated with the first customer, wherein individual personalization data records of the plurality of personalization data records are respectively associated with ones of the plurality of customer identifier records, wherein the plurality of personalization data records include at least one field that contains subscription information indicating at least one publication to which the first customer subscribes using a previous version of the electronic book reader device.

43. The data store embodied on the non-transitory computer-readable storage medium of claim 42, wherein the plurality of customer identifier records include at least one of:

a name associated with the first customer;
a telephone number associated with the first customer;
a customer number associated with the first customer;
a mailing address associated with the first customer; or
an e-mail address associated with the first customer.

44. The data store embodied on the non-transitory computer-readable storage medium of claim 42, wherein the plurality of personalization data records include at least one of:

transaction history associated with the first customer;
information representing item preferences associated with the first customer;
subscription information associated with the first customer;
community membership information associated with the first customer;
contact list information associated with the first customer;
electronic content associated with the first customer; or
bookmark information associated with the first customer.

45. The method of claim 1, wherein the first personalization information loaded into the electronic book reader device comprises a personalized message addressed to a name of the second customer.

46. The method of claim 9, wherein the second personal information of the second customer comprises a name of the second customer.

47. The method of claim 9, wherein the first personal information includes a personalized welcome message directed to the second customer, the personalized welcome message to be presented upon first powering up the electronic device.

48. The method of claim 1, wherein the second personalization information includes a zoom level for displaying content on the electronic book reader device.

49. The method of claim 1, further comprising receiving, from the customer device associated with the first customer, a payment transaction for the order.

50. The method of claim 1, further comprising loading, based on the first personalization information received from the first customer, one or more content recommendations for the second customer into the electronic book reader device before the first use of the electronic book reader device by the second customer.

* * * * *